(12) United States Patent
Baumgartner

(10) Patent No.: US 11,906,023 B2
(45) Date of Patent: Feb. 20, 2024

(54) SYSTEM AND METHODS FOR A GEAR REDUCER

(71) Applicant: Herbert Thomas Baumgartner, Magnolia, TX (US)

(72) Inventor: Herbert Thomas Baumgartner, Magnolia, TX (US)

( * ) Notice: Subject to any disclaimer, the term of this patent is extended or adjusted under 35 U.S.C. 154(b) by 0 days.

(21) Appl. No.: 18/116,422

(22) Filed: Mar. 2, 2023

(65) Prior Publication Data

US 2023/0279933 A1    Sep. 7, 2023

Related U.S. Application Data

(60) Provisional application No. 63/315,768, filed on Mar. 2, 2022.

(51) Int. Cl.
*F16H 37/04* (2006.01)

(52) U.S. Cl.
CPC ................................ *F16H 37/041* (2013.01)

(58) Field of Classification Search
CPC . F16H 1/02; F16H 1/28; F16H 37/041; F16H 2001/2881
See application file for complete search history.

(56) References Cited

U.S. PATENT DOCUMENTS

| | | | | |
|---|---|---|---|---|
| 4,023,440 | A | * | 5/1977 | Kennington .............. F16H 1/32 475/167 |
| 4,071,235 | A | * | 1/1978 | Zent .................... A63B 22/0005 482/62 |
| 2009/0098966 | A1 | * | 4/2009 | Kamada ................... B62M 9/10 474/160 |
| 2017/0101161 | A1 | * | 4/2017 | Cohen ...................... B62M 3/00 |
| 2018/0216712 | A1 | * | 8/2018 | Forrester, Jr. ......... F16H 37/041 |
| 2020/0049133 | A1 | * | 2/2020 | Pellegrin .................. F16H 1/28 |
| 2021/0253070 | A1 | * | 8/2021 | Carroll ...................... B60S 9/06 |

* cited by examiner

*Primary Examiner* — Edwin A Young
(74) *Attorney, Agent, or Firm* — Pierson IP, PLLC

(57) ABSTRACT

A gear reducer with a first center sprocket having a first number of teeth and second center sprocket having a second number of teeth are mechanically coupled by a rotor including a plurality of sprockets, wherein minimal inertial mass is overcome while changing the direction of a driven sprocket.

10 Claims, 10 Drawing Sheets

SYSTEM AND METHODS FOR A GEAR REDUCER

TECHNICAL FIELD

Embodiments disclose systems and methods for a gear reducer to increase torque on an output sprocket. More specifically, embodiments include center sprockets positioned around a rotating shaft, wherein a first center sprocket has a first number of teeth and second center sprocket has a second number of teeth.

BACKGROUND

A gear reducer is a mechanical transmission device that connects a motor to a driven load. The gear reducer allows the modification of torque and speed between the motor and the load. Gear reducers are used in many difference applications, such as when it is desirable to provide rotational power to various components.

For example, in various wheeled or tracked vehicles, a motor with a gear reducer may be coupled to at an output sprocket or hub to drive the wheels or tracks of the vehicle, and thereby move the vehicle over terrain. Such gear reducers may include hydraulic motors providing rotational power, and various gears for adjusting the speed of the rotational power for output at the output hub.

However, arranging and packaging complex assemblies along with gear trains, bearings, shafts and other drive components, in what may be a relatively tight space envelop may be a challenge, particularly when high gear reduction and torque are required.

Accordingly, needs exist for a gear reducer with a first center sprocket having a first number of teeth and second center sprocket having a second number of teeth, wherein minimal inertia mass is required to be overcome to change directions of a driven sprocket.

SUMMARY

Embodiments described a gear reducer with a first center sprocket having a first number of teeth and second center sprocket having a second number of teeth, wherein minimal inertia mass is required to be overcome change directions of a driven sprocket. Wherein the reduction of the amount of teeth between the first center sprocket and the second center sprocket can reduce the gear ratio when driving the output sprocket.

Embodiments may include a housing, motor, center shaft, fixed shaft, first center sprocket, second center sprocket, propeller, first orbiting sprocket, second orbiting sprocket, outer shaft, and driven sprocket.

The housing may be a device that is configured to secure and store other elements of the gear reducer. In embodiments, the housing may be configured to protect the internal elements for environmental impacts, while also protecting users from the internal elements.

The motor may be a machine that is configured to convert energy into rotational mechanical energy. The motor may be configured to drive the center shaft, which may enable the rotation of the center shaft.

The center shaft may be configured to rotate based on receiving forces from the motor. In embodiments, the center shaft may have a proximal end that is coupled to the motor via a coupler, which allows for some allowance of error between for the coupling. Further the coupler allows the proximal end of the center shaft to be longitudinally offset from the motor. The center shaft may have a distal end that extends away and outside of housing. In embodiments, the fixed shaft, first center sprocket, second center sprocket, propeller, first orbiting sprocket, second orbiting sprocket, outer shaft, and driven sprocket may be positioned between the proximal end and the distal end of the center shaft.

The fixed shaft may be positioned around the distal end of the center shaft, and extend into the housing. The fixed shaft may be configured to be rotationally locked while the center shaft rotates. This may enable elements that are directly coupled to the fixed shaft to be mechanically isolated from the impacts of the rotation of the center shaft. In embodiments, a first end of the fixed shaft may be coupled to the first center sprocket, and a second end of the fixed shaft may extend outside of the housing. This may enable an element positioned outside of the housing to secure the fixed shaft in place to restrict the rotation of the fixed shaft. In embodiments, the fixed shaft may be positioned between the propeller and a distal end of the housing. However, in other embodiments, the fixed shaft may be rotationally locked within the housing.

The propeller may be coupled to the center shaft, and may be configured to rotate based on the rotation of the center shaft. The propeller may include a blade and a plurality of arms. The blade may be configured to extend across a center axis of the center shaft, and the blade may be configured to rotate based on rotation of the center shaft. The rotation of the blade may allow the first and second orbiting sprockets to rotate, orbit, etc. around the center shaft. The propeller may include arms that are coupled to the blades, wherein the arms are configured to be coupled to the first and second orbiting sprockets.

A first center sprocket with a first set of teeth may be coupled to the fixed shaft. The first center sprocket may be positioned between the propeller and a distal end of the center shaft. Because the fixed shaft does not rotate, the first center sprocket may not rotate either. Because the first center sprocket does not rotate, torque and other forces may be translated to the second center sprocket. In embodiments, the first center sprocket may be mechanically coupled to the first orbiting sprocket via a first coupling device. In embodiments, the first coupling device may be a chain, belt, etc. The first coupling mechanism may be configured to receive the stress of high reduction all in one stage. Accordingly, a double or triple strand chain may further the durability of the design.

The first orbiting sprocket may be coupled to the propeller via the arm, and to the first center sprocket via the first coupling mechanism. Due to the rotation of the propeller, the first orbiting sprocket may rotate around the first center sprocket.

A second center sprocket with a second set of teeth may be coupled to the outer shaft. The second center sprocket may be positioned between the propeller and a proximal end of the center shaft. In embodiments, the second center sprocket may be mechanically coupled to the second orbiting sprocket via a second coupling device. In embodiments, the second coupling device may be a chain, belt, etc. Furthermore, a radius associated with the first center sprocket and the second center sprocket may be identical.

The second orbiting sprocket may be coupled to the propeller via the arm, and to the second center sprocket via the second coupling mechanism. Due to the rotation of the propeller, the second orbiting sprocket may rotate around the second center sprocket. In embodiments, the first orbiting sprocket and the second orbiting sprocket may be directly coupled to each other via the arm, such that there is no relative movement between the two.

In embodiments, the number of teeth on the first center sprocket may be different than that of the number of teeth on the second center sprocket, wherein the first number of teeth may be greater than or smaller than the second number of teeth. Specifically, the number of teeth on the first center sprocket may be one fewer than that of the second center sprocket. This non-symmetrical number of teeth and the mechanical disconnect between the first center sprocket and the second center sprocket causes the rotation of the second center sprocket to be lower than that of the propeller and the center shaft, increasing the torque on the driven sprocket while reducing the rotations per minute from the center shaft to the driven sprocket.

The outer shaft may be configured to encompass the center shaft, and extend from a proximal end of the center shaft to the second center sprocket. The outer shaft may be mechanically coupled to the second center sprocket, such that the rotation of the second center sprocket causes the rotation of the outer shaft.

The driven sprocket may be positioned on the outer shaft, and may be configured to rotate when the outer shaft rotates. In embodiments, the driven sprocket may be positioned between the proximal end of the center shaft and the propeller. Responsive to the center shaft rotating, the torque of the center shaft may pass the driven sprocket in a first direction along a longitudinal axis of the housing, and rotate the propeller and the orbing sprockets.

Due to the propeller rotating the first orbiting sprocket may rotate about the first center sprocket, wherein the first center sprocket is fixed in place. Additionally, the propeller may simultaneously cause a second orbiting sprocket to rotate about a second center sprocket with a second number of teeth. The reactive torque on the first orbiting sprocket on the first side of the propeller causes the first and second orbiting sprockets to have a change in angle which is in a second, opposite, direction of the input torque, wherein the second orbiting sprocket is on a second side of the propeller. This may cause the torque to travel in a second direction along the longitudinal axis of the housing back towards the driven sprocket. By reversing the direction along the longitudinal axis of the housing, a center of mass of the gear reducer may be more centrally located along the longitudinal axis of the housing due to the motor being positioned on a first side of the driven sprocket and the propeller being positioned on a second side of the driven sprocket.

In embodiments, when the propeller drives the first and second orbiting sprockets around the center shaft, the driven sprocket is edged around and nudged by reduction in the number of teeth between the first and second center sprockets at a rate of 1/C1 per revolution, wherein the second center sprocket is on the outer shaft, which is the same shaft as the final output of the driven sprocket. This ratio may be positive or negative based on which center sprocket has the lower number of teeth. If the calculated ratio is negative, the output runs in the opposite direction of the input.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention. The invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
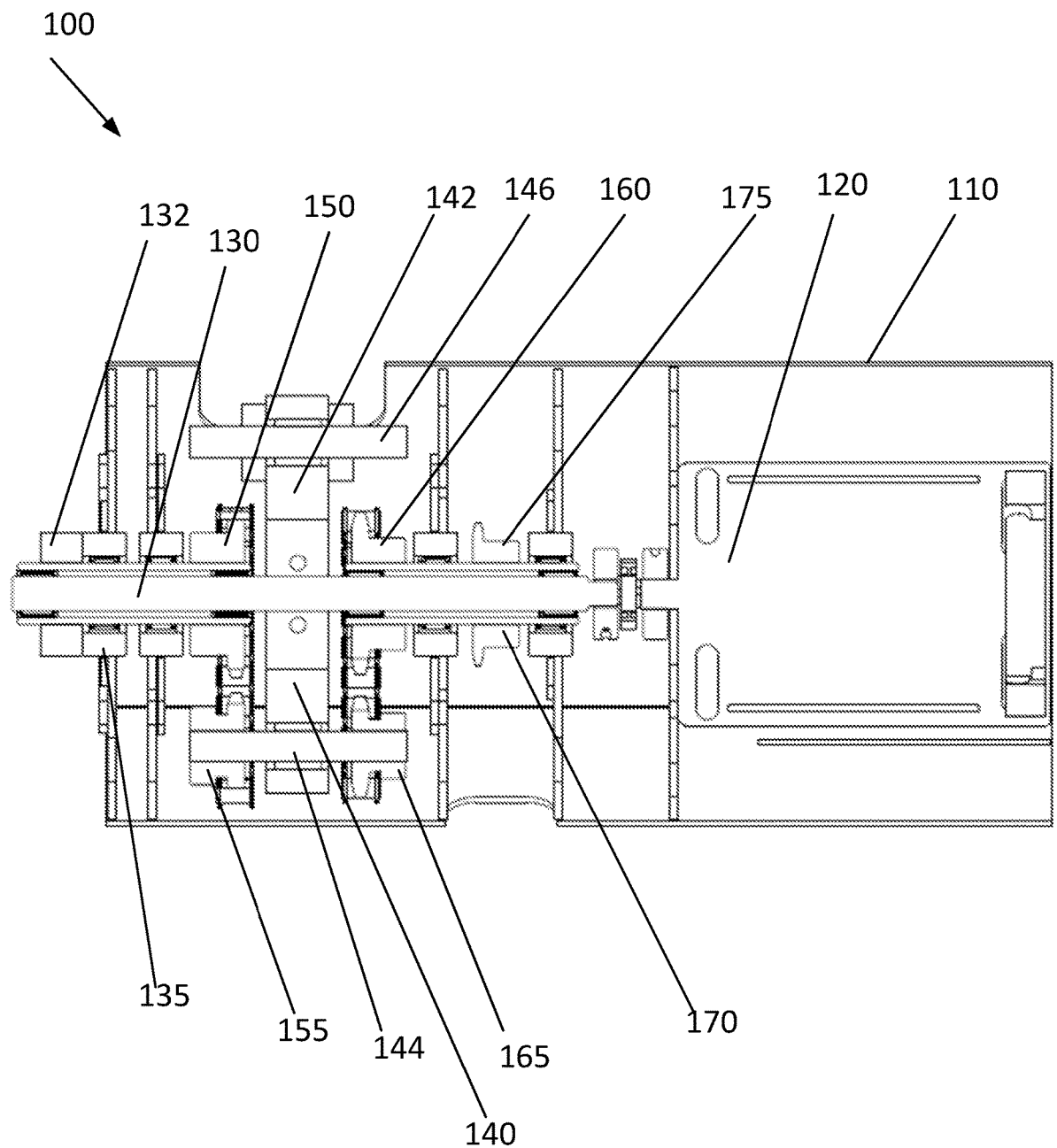
FIG. 1 depicts a side view of a gear reducer, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

FIG. 1 depicts a side view of a gear reducer 100, according to an embodiment. Gear reducer 100 may be configured to increase the torque supplied by a motor to a driven sprocket. Gear reducer 100 may utilize a pair of center sprockets with different number of teeth to reduce the RPMs of the driven sprocket, wherein the reduction of the amount of teeth between the first center sprocket and the second center sprocket can reduce the gear ratio when rotating the driven sprocket. Gear reducer 100 may include a housing 110, motor 120, center shaft 130, fixed shaft 135, propeller, 140, first center sprocket 150, second center sprocket 160, first orbiting sprocket 155, second orbiting sprocket 165, outer shaft 170, and driven sprocket 175.

Housing 110 may be a device that is configured to secure and store other elements of the gear reducer 100. Housing 110 may be configured to protect the internal elements for environmental impacts, while also protecting users from the internal elements. Housing 110 may be formed of various materials, such as carbon fiber, plastics, metal, etc.

Motor 120 may be a machine that is configured to convert energy into rotational mechanical energy. Motor 120 may be configured to drive the center shaft 130, which may enable the rotation of the center shaft 130. In embodiments, motor 120 may be any device that is configured to rotate center shaft 130, wherein motor 120 may be configured to rotate center shaft 120 in a clockwise and/or counter clockwise fashion.

Center shaft 130 may be a rod, bar, dowel, etc. that is configured to rotate based on receiving forces from motor 120. Center shaft 130 may have a proximal end that is coupled to motor 120 via a coupler, which allows for some allowance of error between for the coupling. Furthermore, the coupler may be configured to allow the proximal end of center shaft 130 to be offset from motor 120 along a longitudinal axis of housing 110. Center shaft 130 may have a distal end that extends away and outside of housing 110. However, in other embodiments, an entirety of center shaft 130 may be contained within housing 110.

The fixed shaft 135 may be a tube, pipe, cylinder that is configured to encompass portions of center shaft 130. Fixed shaft 135 may be positioned around the distal end of center shaft 130. Fixed shaft 135 may have a first end positioned within housing 110 and a distal end positioned outside of housing 110. This may enable an object to rotationally lock fixed shaft, such that the rotation of center shaft 130 does not turn fixed shaft 135. For example, a distal end of fixed shaft 135 may be coupled to a rotational lock 132, which inhibits the rotation of fixed shaft 135. Accordingly, elements that are directly coupled to fixed shaft 135 may be mechanically isolated from the impacts of the rotation of the center shaft 130. However, in other embodiments, fixed shaft 132 may be rotationally locked within the housing. In embodiments, a first end of the fixed shaft 135 may be coupled to the first center sprocket 150, and a second end of the fixed shaft may extend outside of the housing 110. In other words, fixed shaft 135 and first center sprocket 150 may be positioned on a first side of propeller 140. This relative positioning may assist with centrally locating a center of mass of gear reducer 100 within housing 110.

Propeller 140 may be a device that is configured to rotate based on the rotational of center shaft 130. Propeller 140 may be coupled to center shaft 130 such that the rotation of propeller is directly dependent on the rotation of center shaft 130. Propeller 140 may include a blade 142 and a plurality of arms 144, 146. Blade 142 may be a body that is configured to position arms 144, 146 away from center shaft 130 to provide clearance orbiting sprockets 155, 165 are rotating. Blade 142 may extend in a direction perpendicular to a central axis of center shaft 130. The rotation of the blade 142 may allow the orbiting sprockets 155, 165 to rotate, or orbit, around the center shaft 130. Arms 144, 146 may be coupled to blade 142 and orbiting sprockets 155, 165. Arms 144, 146 may extend away from blade 142 in a direction that is in parallel with a central axis of center shaft 130, which may provide clearance between blade 142 and orbiting sprockets 155, 165.

First center sprocket 150 may be a sprocket that is positioned around fixed shaft 135. First center sprocket 150 may have a first set of teeth with a first number of teeth. First center sprocket 150 may be positioned on fixed shaft 135 between the propeller 140 and a distal end of center shaft 130. Because the fixed shaft 135 does not rotate, first center sprocket 150 may not rotate either. In embodiments, first center sprocket 150 may be mechanically coupled to the first orbiting sprocket 155 via a first coupling device. In embodiments, the first coupling device may be a chain, belt, etc. The first coupling mechanism may be configured to receive the stress of high reduction all in one stage. Accordingly, a double or triple strand chain may further the durability of the design. Furthermore, by rotationally locking first center sprocket 150 power losses associated with first center sprocket 150 may be minimized. In embodiments, first center sprocket 150 may be any device that is configured to rotate to transfer forces.

The first orbiting sprocket 155 may be coupled to the propeller 140 via the arm 144, and to the first center sprocket 150 via the first coupling mechanism. Due to the rotation of the propeller 140, the first orbiting sprocket 155 may rotate around the first center sprocket 150 and fixed shaft 135.

Second center sprocket 160 may be a sprocket positioned around outer shaft 170. Responsive to second center sprocket rotating 160, the forces generated by second center sprocket 160 may be transferred to outer shaft 170. Second center sprocket 160 may have a second set of teeth that includes a second number of teeth. The numbers of teeth within the first set of teeth and the second set of teeth may be different. For example, the first set of teeth may include twenty five teeth, while the second set of teeth may include twenty six teeth. Second center sprocket 160 may be positioned between the propeller 140 and a proximal end of the center shaft 130. In embodiments, second center sprocket 160 may be mechanically coupled to the second orbiting sprocket 165 via a second coupling device. In embodiments, the second coupling device may be a chain, belt, etc. Responsive to second center sprocket rotating 160, outer shaft 170 may correspondingly rotate.

Second orbiting sprocket 165 may be coupled to the propeller 140 and first orbiting sprocket 155 via the arm 144 (or 146). Second orbiting sprocket 165 may also be coupled to second center sprocket 160 via the second coupling mechanism. First orbiting sprocket 155 and second orbiting sprocket 165 may be directly coupled to each other via arm 144, wherein the rotation of arm 144 causes first orbiting sprocket 155 and second orbiting sprocket 165 to simultaneously rotate about center shaft 130. Accordingly, there is no relative movement between the two orbiting sprockets 155, 165.

In embodiments, first orbiting sprocket 155 and second orbiting sprocket 165 may be symmetrical in shape. In embodiments, the rotation of arm 144 about center shaft 130 may cause orbiting sprockets 155, 165 to rotate, which may cause second center sprocket 160 to rotate. However, due to the non-symmetrical number of teeth between first center sprocket 150 and second center sprocket 160 and the mechanical disconnect between the first center sprocket 150 and second center sprocket 160 causes the rotation of second center sprocket 160 to be lower than that of the propeller 140 and the center shaft 130, increasing the torque on the driven sprocket while reducing the rotations per minute from the center shaft 130 to the driven sprocket 175.

Outer shaft 170 may be configured to encompass the center shaft 130, and extend from a proximal end of the center shaft 130 to the second center sprocket 160. Outer shaft 170 may be mechanically coupled to the second center sprocket 160, such that the rotation of the second center sprocket 160 causes the rotation of the outer shaft 170. Accordingly, rotation of center shaft 130 at a first RPM may cause propeller 140 to turn, causing orbiting sprockets 155, 165 to rotate, rotating second center sprocket 160, and turning outer shaft 170 at a second RPM due to the different number of teeth or center sprockets 150, 160.

The driven sprocket 175 may be positioned on outer shaft 170. Driven sprocket 175 may rotate when outer shaft 170 rotates. In embodiments, driven sprocket 175 may be coupled to an external element, such as a wheel.

In embodiments, when the propeller 140 drives the first and second orbiting sprockets 155, 165 around, the driven sprocket 175 is edged around and nudged by reduction in the number of teeth between the center sprockets 150, 160 at a rate of 1/C1 per revolution, wherein the second center sprocket 160 is on the same shaft as the final output of the driven sprocket 175.

In embodiments, the propeller 140 may be configured to receive a rotational force from motor through center shaft 130, wherein propeller 140 receives the force in a first direction. Due to the propeller 140 rotating the first orbiting sprocket 155 may rotate about the first center sprocket 150, wherein the first center sprocket 150 is fixed in place. Additionally, the propeller 140 may simultaneously cause the second orbiting sprocket 160 to rotate about a second center sprocket with the second number of teeth. The reactive torque on the first orbiting sprocket 150 on the first side of the propeller 140 causes the first 155 and second orbiting sprockets 165 to have a change in angle which is in a second, opposite, direction of the input torque, wherein the second orbiting sprocket 165 is on a second side of the propeller. This may cause the torque reverse directions and travel in a second direction along the longitudinal axis of the housing back 110 towards the driven sprocket 175. By reversing the direction along the longitudinal axis of the housing 110, a center of mass of the gear reducer may be more centrally located along the longitudinal axis of the housing 110 due to the motor being positioned on a first side of the driven sprocket 175 and the propeller 140 being positioned on a second side of the driven sprocket 175.

Figure 2:
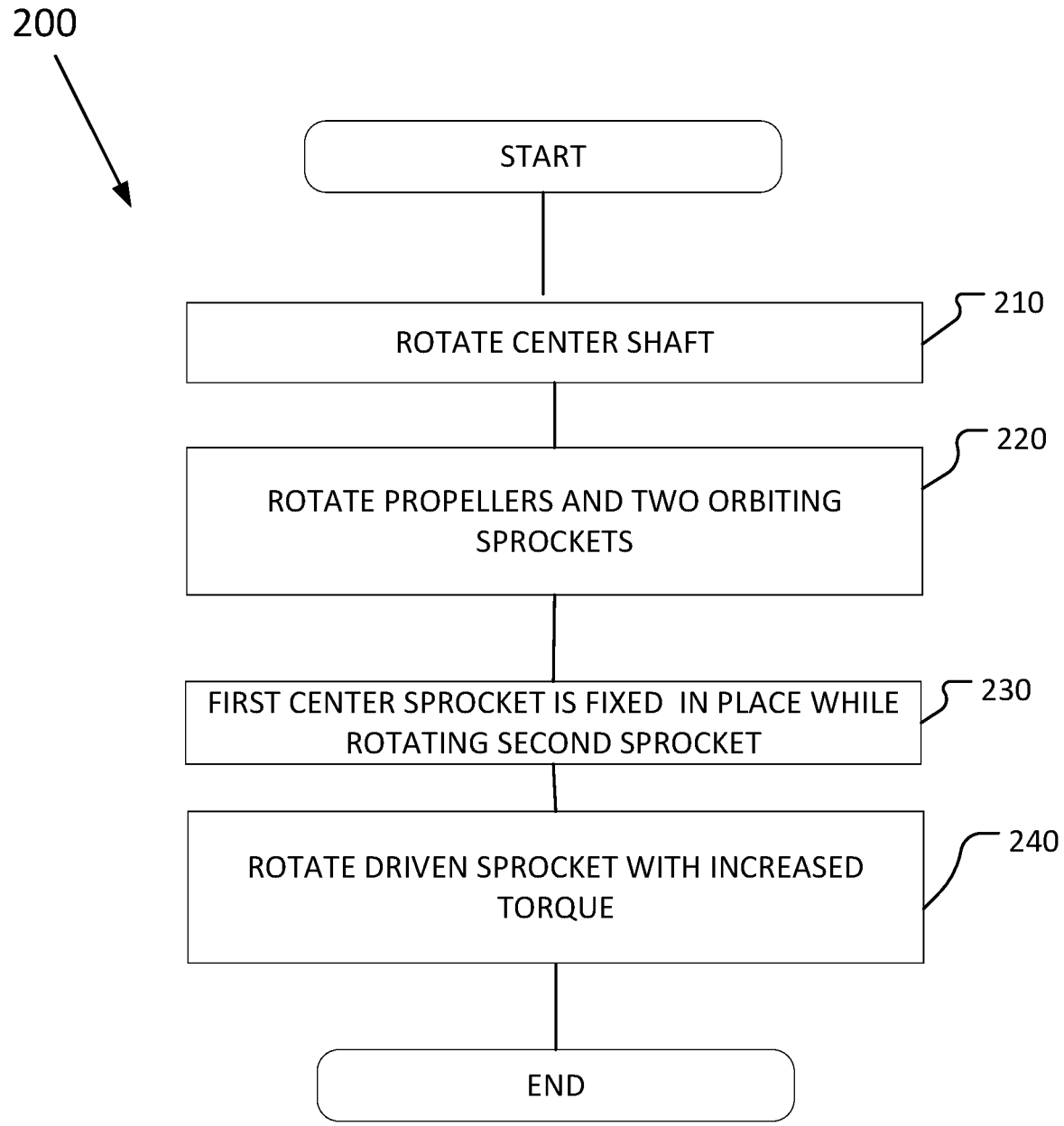
FIG. 2 illustrates a method for a gear reducer, according to an embodiment.

FIG. 2 illustrates a method 200 for a gear reducer. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and are described below is not intended to be limiting.

At operation 210, a motor may drive a center shaft. The motor may rotate the center shaft at a first RPM with a first torque.

At operation 220, the rotation of the center shaft may cause a propeller to rotate. The rotation of the propeller may cause multiple orbiting sprockets to simultaneously rotate about the center shaft as well, wherein the orbiting sprockets are on different sides of the propeller.

At operation 230, due to the propeller rotating a first orbiting sprocket may rotate about a first center sprocket with a first number of teeth, wherein the first center sprocket is fixed in place. Simultaneously, the propeller may simultaneously cause a second orbiting sprocket to rotate about a second center sprocket with a second number of teeth. In embodiments, the reactive torque on the first orbiting sprocket on the first side of the propeller causes the first and second orbiting sprockets to have a change in angle which is in the opposite direction of the input torque, wherein the second orbiting sprocket is on a second side of the propeller. The total three hundred sixty-degree change in angle of the input shaft is translated through the orbiting gearset, which is constantly falling away, but still using a portion of the change in angle to drive the output by some proportion. In embodiments, the output proportion is as follows: $1-((C2/O2)/(C1/O1))$. Due to the symmetrical rotation of the first orbiting sprocket, the locking in place of the first center sprocket, and the second orbiting sprocket and the uneven number of teeth between the first center sprocket and the second center sprocket, the second center sprocket may rotate at a different RPM than the propeller with an increased torque.

At operation 240, the rotation of the second center sprocket may rotate an outer shaft to drive a driven sprocket.

Figure 3:
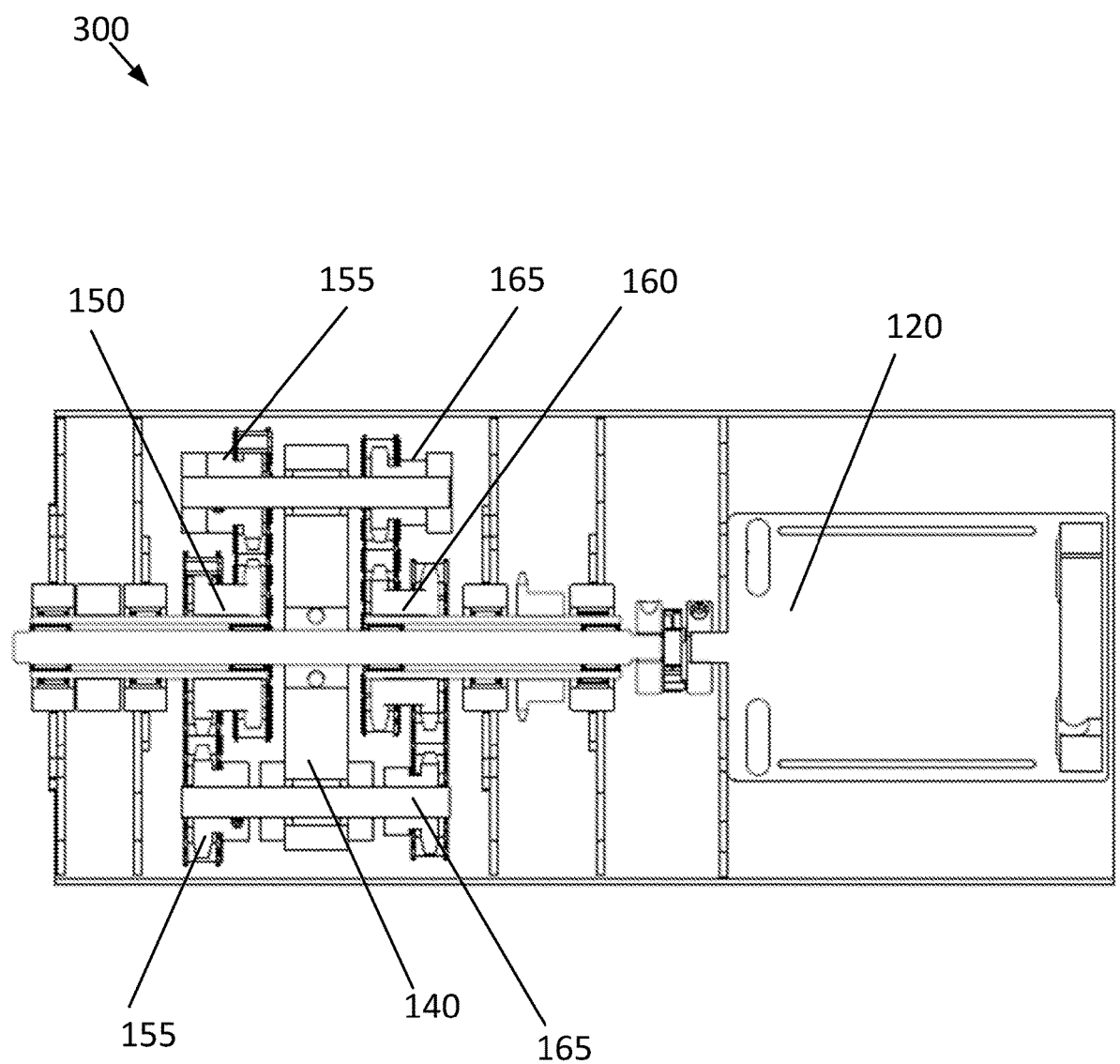
FIGS. 3 and 4 depict a gear reducer, according to an embodiment.
Figure 4:
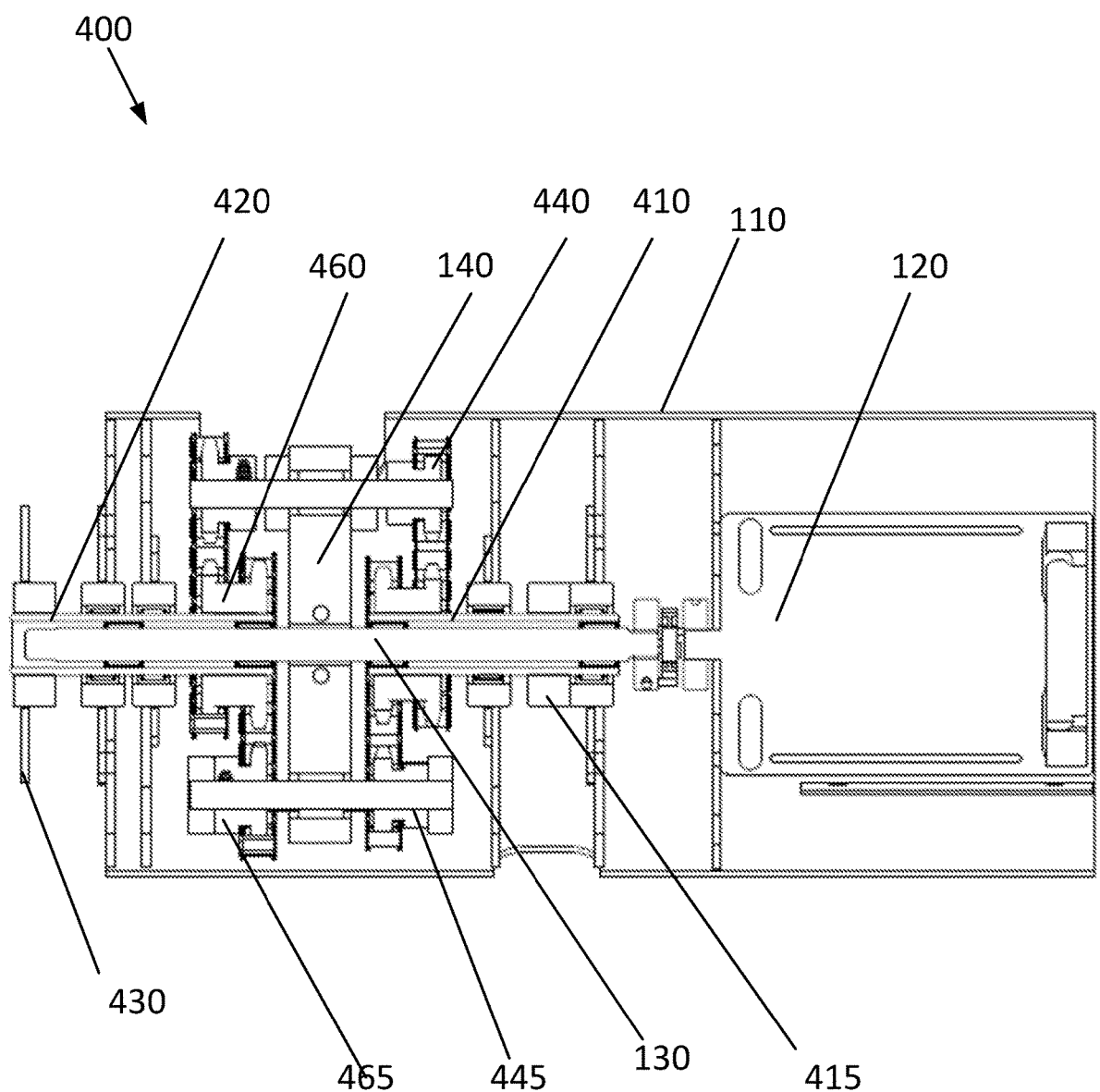

FIGS. 3 and 4 depict a gear reducer 300 and 400, according to an embodiment. Elements depicted in FIGS. 3 and 4 may be described above, and for the sake of brevity a further description of these elements may be omitted.

As depicted in FIGS. 3, gear reducer 300 may include two first orbiting sprockets 155 may be configured to orbit around first center sprocket 150, and two second orbiting sprockets 165 may be configured to orbit around second center sprocket 160. This may provide for symmetrical rotation of the orbiting sprockets on both sides of propeller 140. Furthermore, by having multiple orbiting sprockets rotating about a corresponding center sprocket, tensions applied to a chain coupled to the corresponding center sprocket and orbiting sprockets may be reduced due to the additional contact surfaces.

Gear reducer 400 may be an inline gear reducer, wherein the rotational forces transmitted from motor 120 continue along a same linear direction along a longitudinal axis of housing 110.

As depicted in FIG. 4, center shaft 130 may be configured to rotate based on receiving forces from the motor 120. The center shaft 130 may have a distal end that extends away and outside of housing. This may enable driven sprocket 430 to be positioned outside of housing 110. This positioning may be advantageous when desiring to position a wheel along a central axis of center shaft 130.

Unlike in FIG. 1, fixed shaft 410 may be positioned around a proximal end of the center shaft. The fixed shaft may be configured to be rotationally locked while the center shaft 130 rotates. This may enable elements that are directly coupled to the fixed shaft 410 to be mechanically isolated from the impacts of the rotation of the center shaft 130. Further, fixed shaft 410 may be positioned between motor 120 and propeller 140.

A first end of the fixed shaft 410 may be coupled to the first center sprocket 440, and a second end of fixed shaft 410 may be coupled to mechanical lock 415.

The propeller 140 may be coupled to the center shaft 130, and may be configured to rotate based on the rotation of the center shaft 130.

A first center sprocket 440 with a first set of teeth may be coupled to the fixed shaft 410. The first center sprocket 440 may be positioned between the propeller and a proximal end of the center shaft 130. First center sprocket 440 may be mechanically coupled to the first orbiting sprocket 445 via a first coupling device.

The first orbiting sprocket 445 may be coupled to the propeller 140 via the arm, and to the first center sprocket 45 via the first coupling mechanism. Due to the rotation of the propeller 140, the first orbiting sprocket 445 may rotate around the first center sprocket.

Second center sprocket 460 with a second set of teeth may be coupled to the outer shaft 420. Second center sprocket 460 may be positioned between the propeller and a distal end of the center shaft 130. In embodiments, second center sprocket 460 may be mechanically coupled to second center sprocket 460 via a second coupling device.

The second orbiting sprocket 465 may be coupled to the propeller 140 via the arm, and to rotate second orbiting sprocket 465 via the second coupling mechanism. Due to the rotation of the propeller 140, second orbiting sprocket 465 may rotate around the second center sprocket 460. In embodiments, the first orbiting sprocket 445 and the second orbiting sprocket 465 may be directly coupled to each other via the arm, such that there is no relative movement between the two sprockets.

In embodiments, the number of teeth on the first center sprocket may be different than that of the number of teeth on the second center sprocket, wherein the first number of teeth may be greater than or smaller than the second number of teeth.

The outer shaft 420 may be configured to encompass the center shaft 130, and extend from the second center sprocket 460 to a location outside of housing 110 along a central axis of center shaft 130. Outer shaft 420 may be mechanically coupled to the second center sprocket 460, such that the rotation of the second center sprocket 460 causes the rotation of outer shaft 420. The driven sprocket 460 may be positioned on the outer shaft, and may be configured to rotate when the outer shaft 460 rotates. In embodiments, driven sprocket 460 may be positioned outside of housing 110.

Figure 5A:
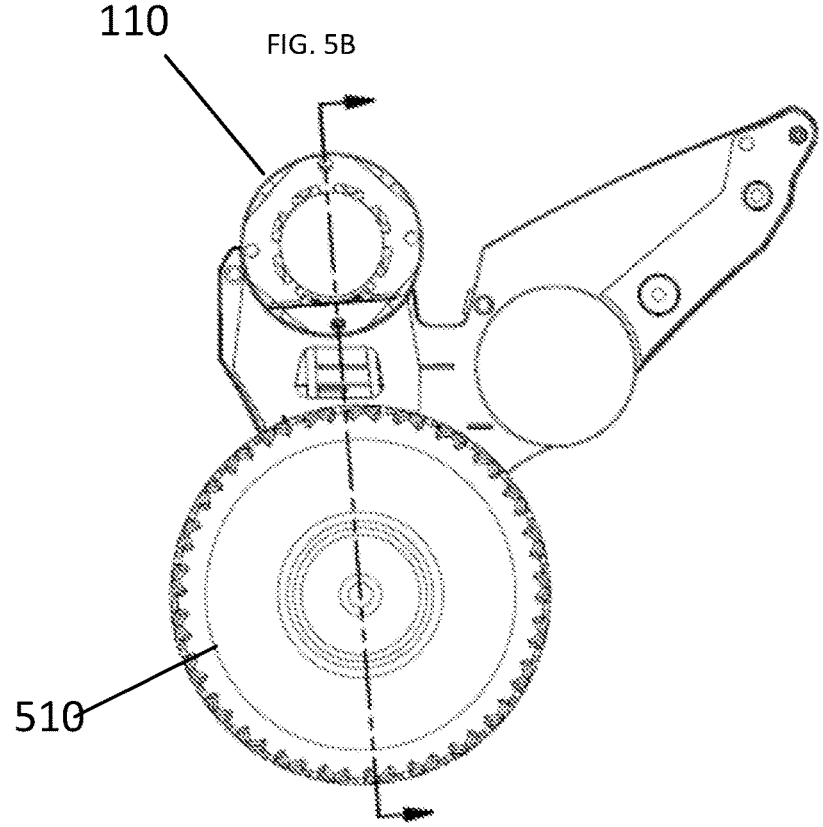
FIGS. 5A and 5B depict an embodiment of a gear reducer, according to an embodiment.
Figure 5B:
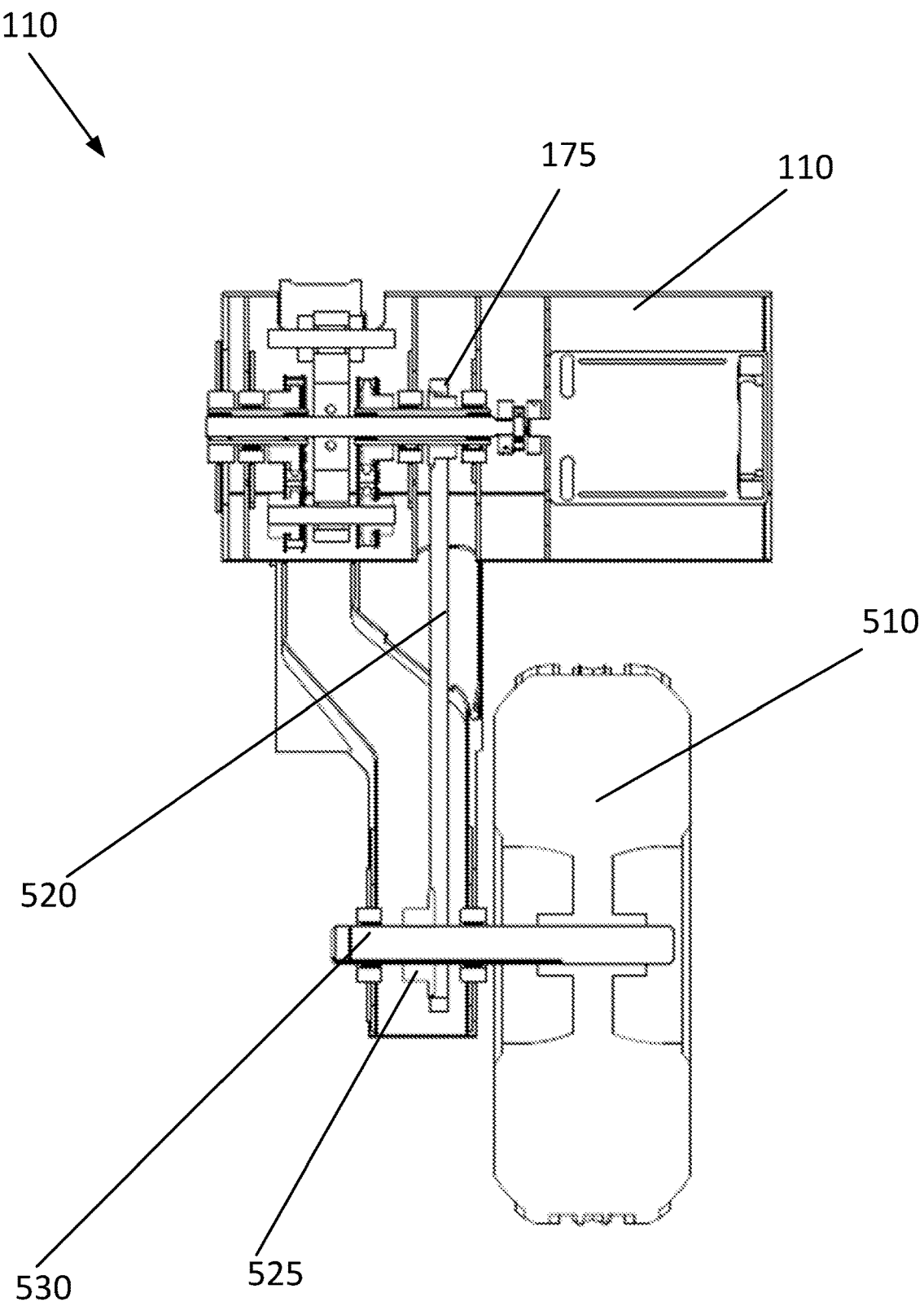

FIGS. 5A and 5B depict an embodiment of a gear reducer 100, according to an embodiment. Elements depicted in FIG. 5 may be described above, and for the sake of brevity a further description of these elements may be omitted.

As depicted in FIG. 5, driven sprocket 175 may be coupled to a chain 520, belt, band, etc., wherein responsive to driven sprocket 175 rotating chain 520 may correspondingly rotate. This rotation of chain 510 may cause a secondary sprocket 525 to turn an axle 530 coupled to wheel 510.

Figure 6:
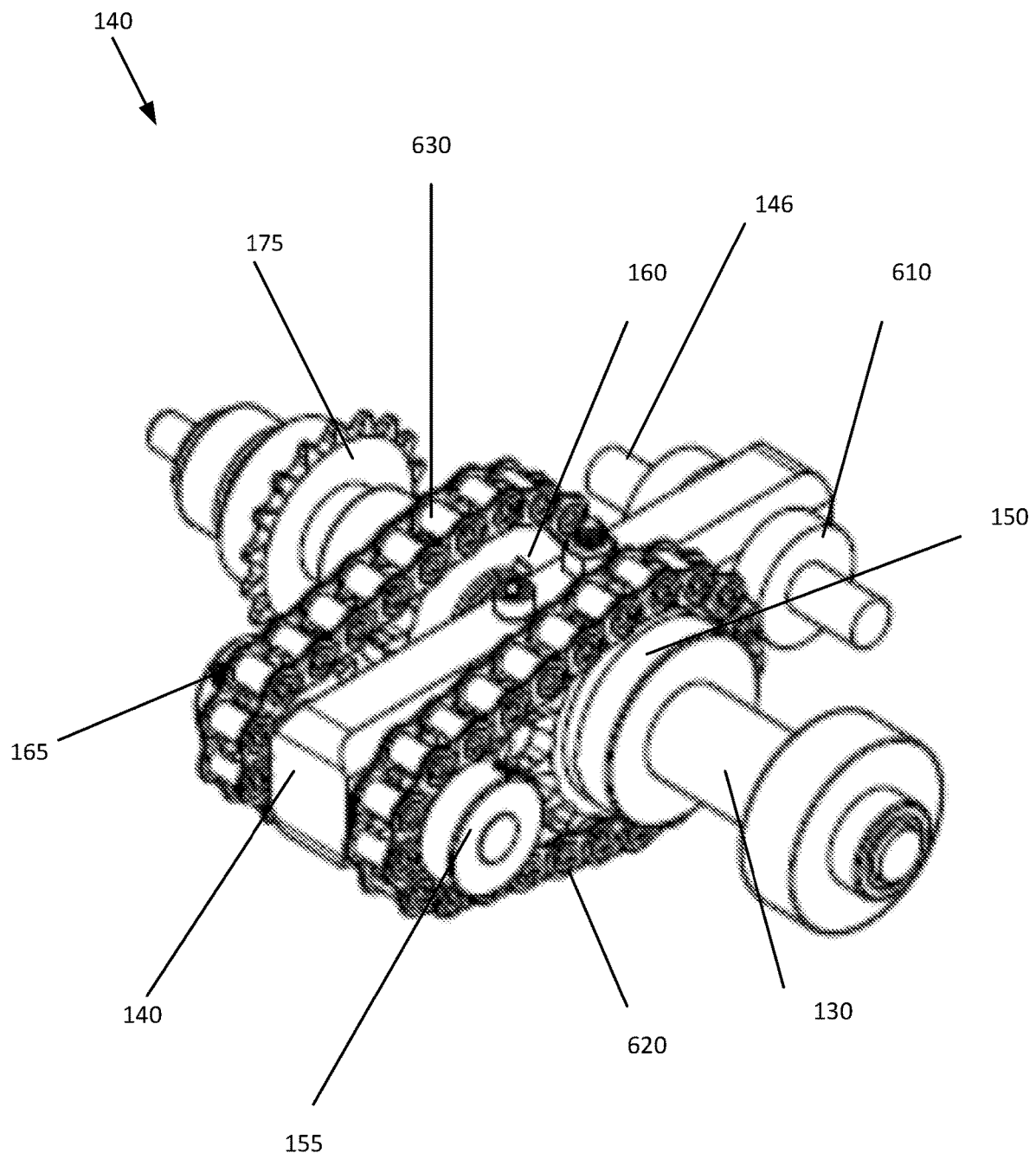
FIG. 6 depicts an embodiment of a propeller, according to an embodiment.

FIG. 6 depicts an embodiment of a propeller 140, according to an embodiment. Elements depicted in FIG. 6 may be described above, and for the sake of brevity a further description of these elements may be omitted.

As depicted in FIG. 6, a first center sprocket 150 may be coupled to only a single orbiting sprocket 155, and a second center sprocket 160 may be coupled to only a second orbiting sprocket 165. A counter weight 610, bolt, sprocket etc. may be coupled to second arm 146 of propeller 140 to provide similar weighting against propeller 140.

A first chain 620 may be positioned around first center sprocket 150 and a single orbiting sprocket 155, and a second chain 630 may be positioned around second center sprocket 160 and a single orbiting sprocket 165. This may create a non-symmetrical propeller, which may limit the required clearances for the rotation of propeller 140. In embodiments, chains 620 and 630 may be identical chains with the same number of links. However, in embodiments chains 620 and 630 may have a different numbers of links.

Figure 7:
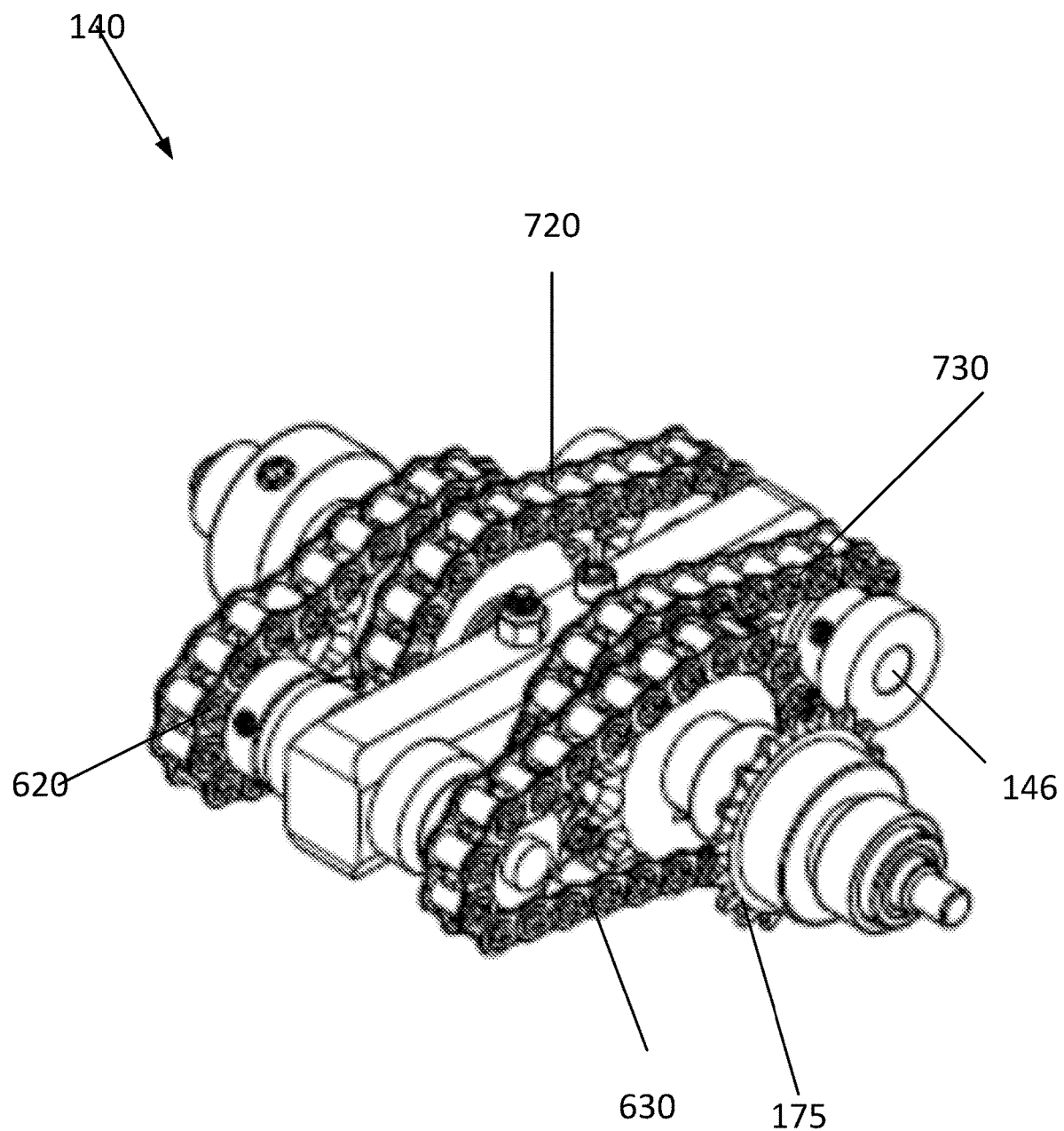
FIG. 7 depicts an embodiment of a propeller, according to an embodiment.

FIG. 7 depicts an embodiment of a propeller 140, according to an embodiment. Elements depicted in FIG. 7 may be described above, and for the sake of brevity a further description of these elements may be omitted.

As depicted in FIG. 7, multiple chains 620, 630 may be coupled to the first center sprocket, and multiple chains 720, 730 may be coupled to the second center sprocket. Chains 620, 630 may be coupled to a different first orbiting sprocket, and chains 720, 730 may be coupled to a different second orbiting sprocket. By having multiple orbiting sprockets rotating about a corresponding center sprocket, tensions applied to a chain coupled to the corresponding center sprocket and orbiting sprockets may be reduced due to the additional contact surfaces.

Figure 8:
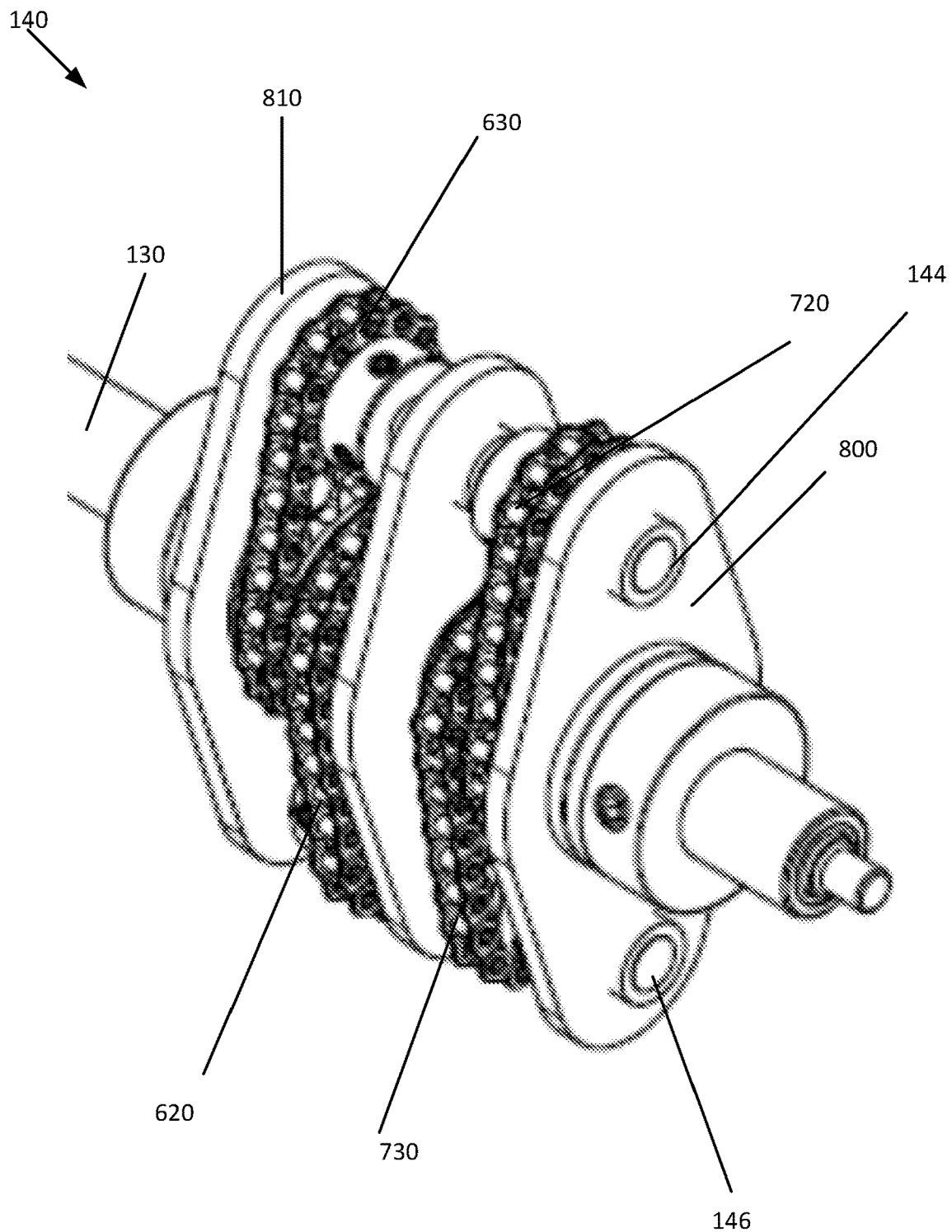
FIG. 8 depicts an embodiment of a propeller, according to an embodiment.

FIG. 8 depicts an embodiment of a propeller 140, according to an embodiment. Elements depicted in FIG. 7 may be described above, and for the sake of brevity a further description of these elements may be omitted.

As depicted in FIG. 8, a first stabilizer plate 800 may be positioned on a first side of propeller 140, and a second stabilizer plate 810 may be positioned on a second side of propeller 140. First stabilizer plate 810 and second stabilizer plate 820 may be configured to receive first arm 144 and second arm 146, and assist with stabilizing the elements coupled to propeller 140 as propeller 140 rotates.

Figure 9:
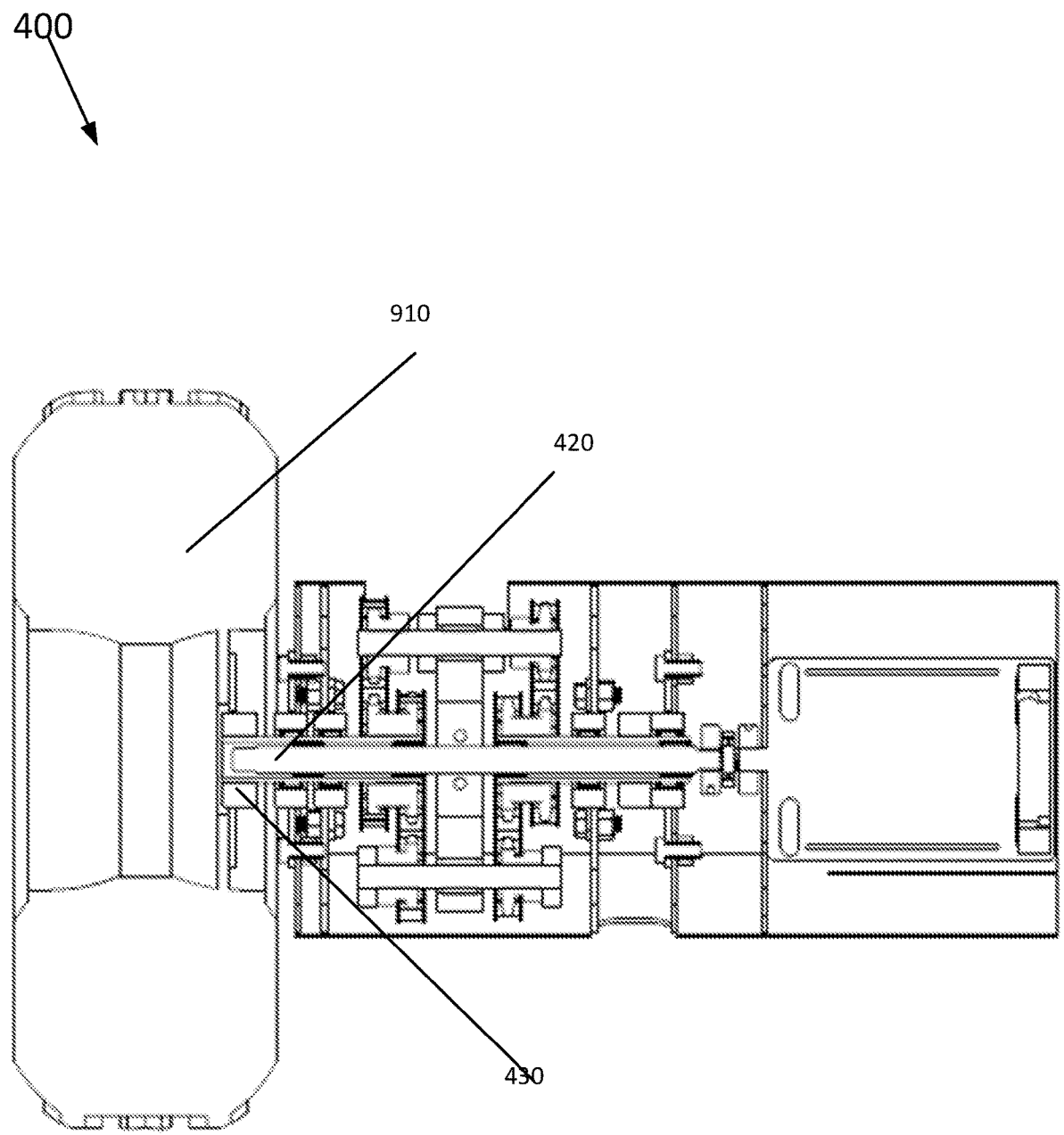
FIG. 9 depicts an embodiment of gear reducer, according to an embodiment.

FIG. 9 depicts an embodiment of gear reducer 400, according to an embodiment. Elements depicted in FIG. 9 may be described above, and for the sake of brevity a further description of these elements may be omitted.

As depicted in FIG. 9, a driving sprocket 430 may be positioned outside of housing 110, and be directly coupled to a wheel 910. Responsive to driving sprocket 430 rotating, wheel 910 may correspondingly rotate.

In the foregoing specification, embodiments have been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of the invention.

Although the invention has been described with respect to specific embodiments thereof, these embodiments are merely illustrative, and are thus not restrictive of the invention. The description herein of illustrated embodiments of the invention is not intended to be exhaustive or to limit the invention to the precise forms disclosed herein (in particular, the inclusion of any particular embodiment, feature, or function is not intended to limit the scope of the invention to such embodiment, feature, or function).

Rather, the description is intended to describe illustrative embodiments, features and functions in order to provide a person of ordinary skill in the art context to understand the invention without limiting the invention to any particularly described embodiment, feature, or function. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes, and substitutions are intended in the foregoing disclosures. It will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment.

Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A gear reducer comprising:
   a center shaft configured to rotate a propeller;
   a first center sprocket positioned on a first side of the propeller, the first center sprocket being coupled to a fixed shaft;
   a second center sprocket positioned on a second side of the propeller, the second center sprocket being coupled to an outer shaft;
   a first orbiting sprocket being coupled to the propeller via a first arm, the first orbiting sprocket having a first set of teeth, the first orbiting sprocket being mechanically coupled to the first center sprocket;
   a second orbiting sprocket being coupled to the propeller via the first arm, the second orbiting sprocket having a second set of teeth, the second orbiting sprocket being mechanically coupled to the second center sprocket, wherein the first set of teeth have a different number of teeth than the second set of teeth.

2. The gear reducer of claim 1, wherein the first arm mechanically couples the first orbiting sprocket with the second orbiting sprocket so that there is no relative movement between the first orbiting sprocket and the second orbiting sprocket.

3. The gear reducer of claim 1, wherein a first number of teeth of the first orbiting sprocket is greater than or less than a second number of teeth of the second orbiting sprocket by one.

4. The gear reducer of claim 1, wherein the outer shaft radially encompasses the center shaft, and the outer shaft is positioned between the propeller and a motor along a longitudinal axis of the gear reducer.

5. The gear reducer of claim 4, wherein the outer shaft is configured to rotate responsive to the second center sprocket being rotated by the second orbiting sprocket.

6. The gear reducer of claim 5, wherein the outer shaft is coupled to a driving sprocket, wherein the driving sprocket is positioned between the propeller and the motor along the longitudinal axis of the gear reducer.

7. The gear reducer of claim 6, wherein the motor is configured to supply rotational energy towards the propeller in a first direction along the longitudinal axis, and the second center sprocket is configured to supply rotational energy towards the driving sprocket in a second direction along the longitudinal axis, wherein the first direction and second direction are opposite directions.

8. The gear reducer of claim 1, wherein a first rotations per minute of the second center sprocket is lower than a second rotations per minute of the center shaft.

9. The gear reducer of claim 1, wherein the first center sprocket is coupled to the first orbiting sprocket via a first chain, and the second center sprocket is coupled to the second orbiting sprocket via a second chain.

10. The gear reducer of claim 9, wherein a first number of links on the first chain is different than a second number of links on the second chain.

* * * * *